United States Patent  [15] 3,680,686
Ciesielski  [45] Aug. 1, 1972

[54] BELT PENETRATION SENSING APPARATUS

[72] Inventor: Bernard A. Ciesielski, Chicago, Ill.

[73] Assignee: FMC Corporation, San Jose, Calif.

[22] Filed: Feb. 12, 1971

[21] Appl. No.: 114,923

[52] U.S. Cl. ................................... 198/232, 198/40
[51] Int. Cl. .............................................. B65g 41/00
[58] Field of Search ............................. 198/232, 40

[56] References Cited

UNITED STATES PATENTS 2,880,852 4/1959 Bergmann ................... 198/232
2,475,404 7/1949 Reed ............................. 198/40

*Primary Examiner*—Richard E. Aegerter
*Attorney*—F. W. Anderson and C. E. Tripp

[57] ABSTRACT

A device to protect a conveyor belt from tearing after penetration by an object at a loading region. The device consists of a series of force-sensitive switches having contact surfaces that are perpendicular to the underside of the belt and an electrical circuit interconnected with the switches that will shut down the conveyor and sound the alarm with the actuation of one of the switches by a penetrating object.

4 Claims, 5 Drawing Figures

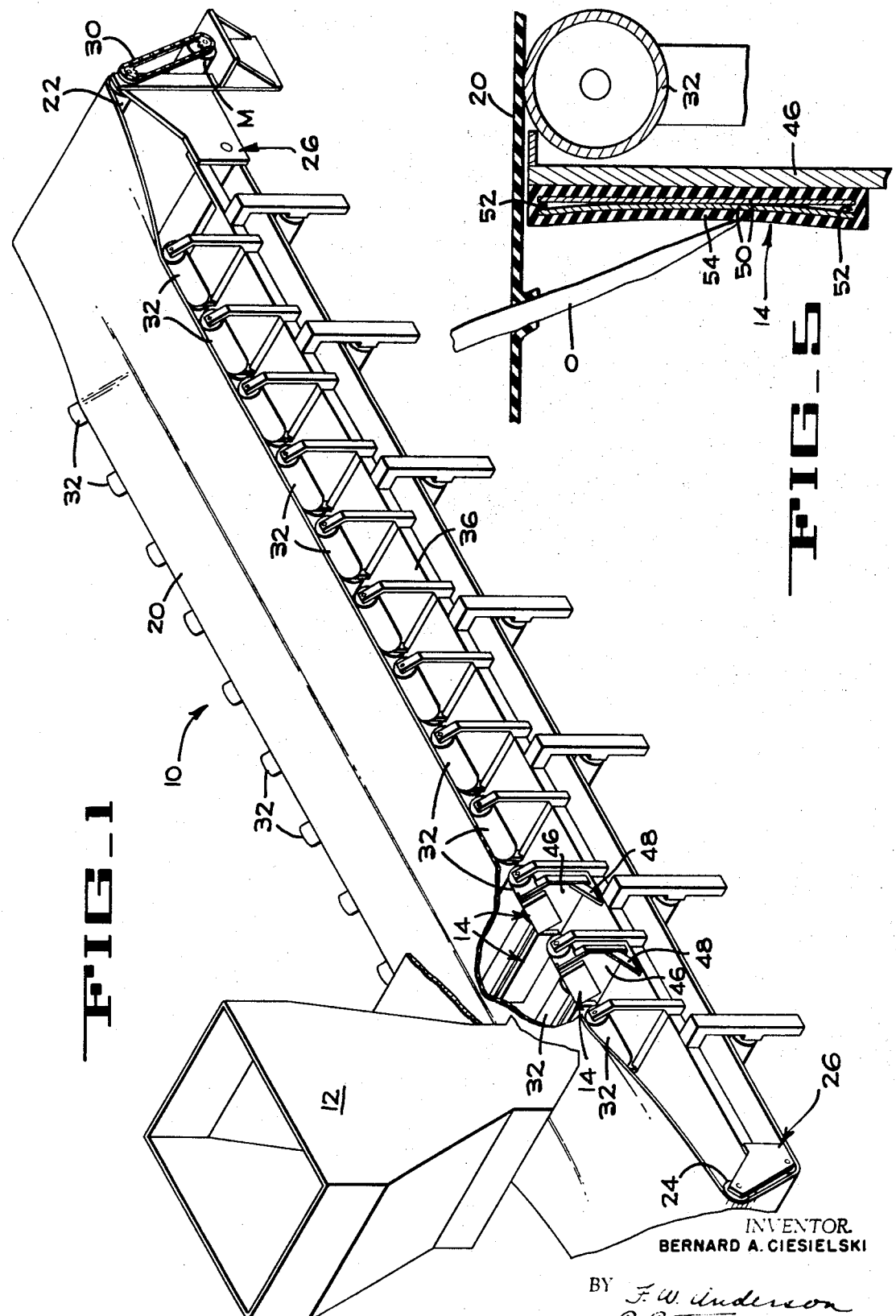

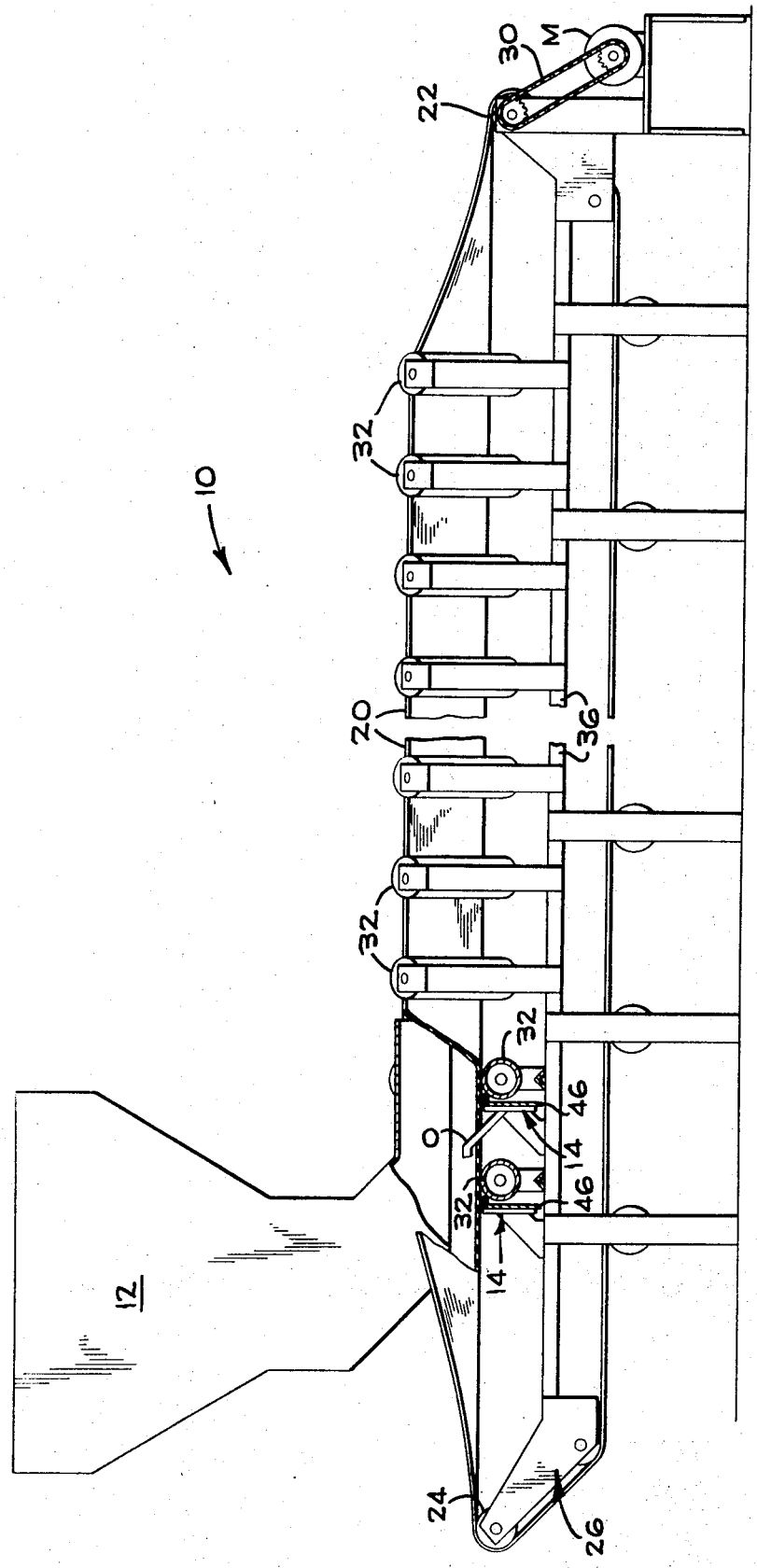

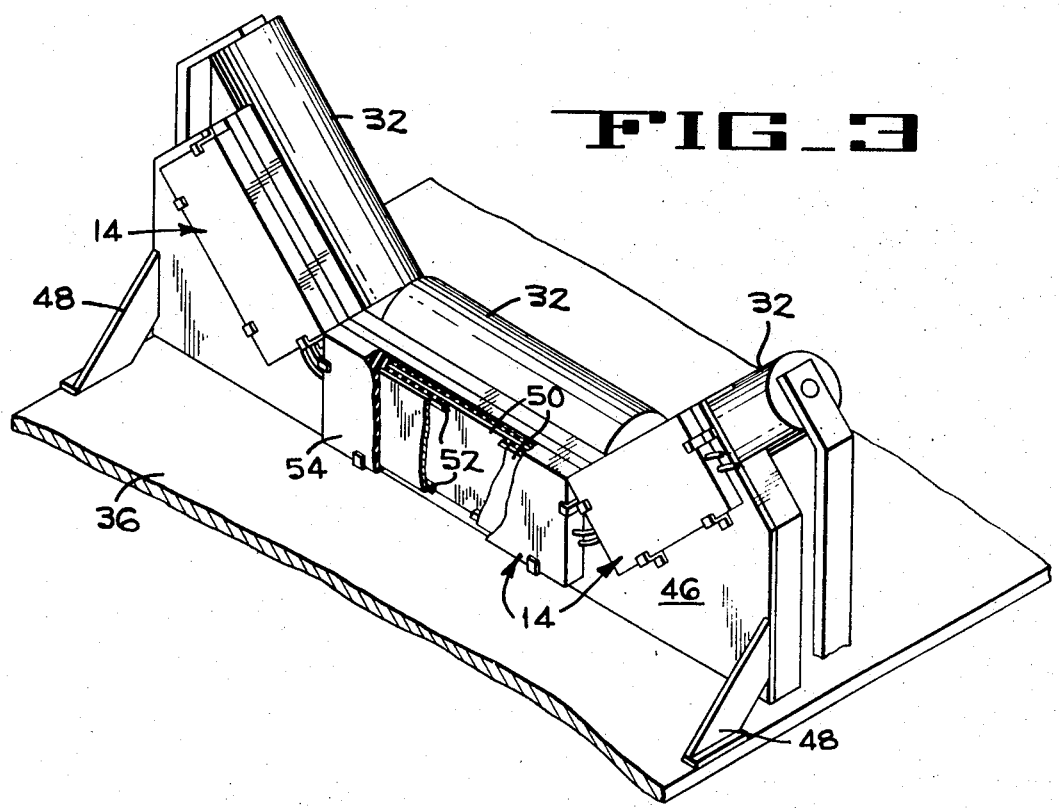
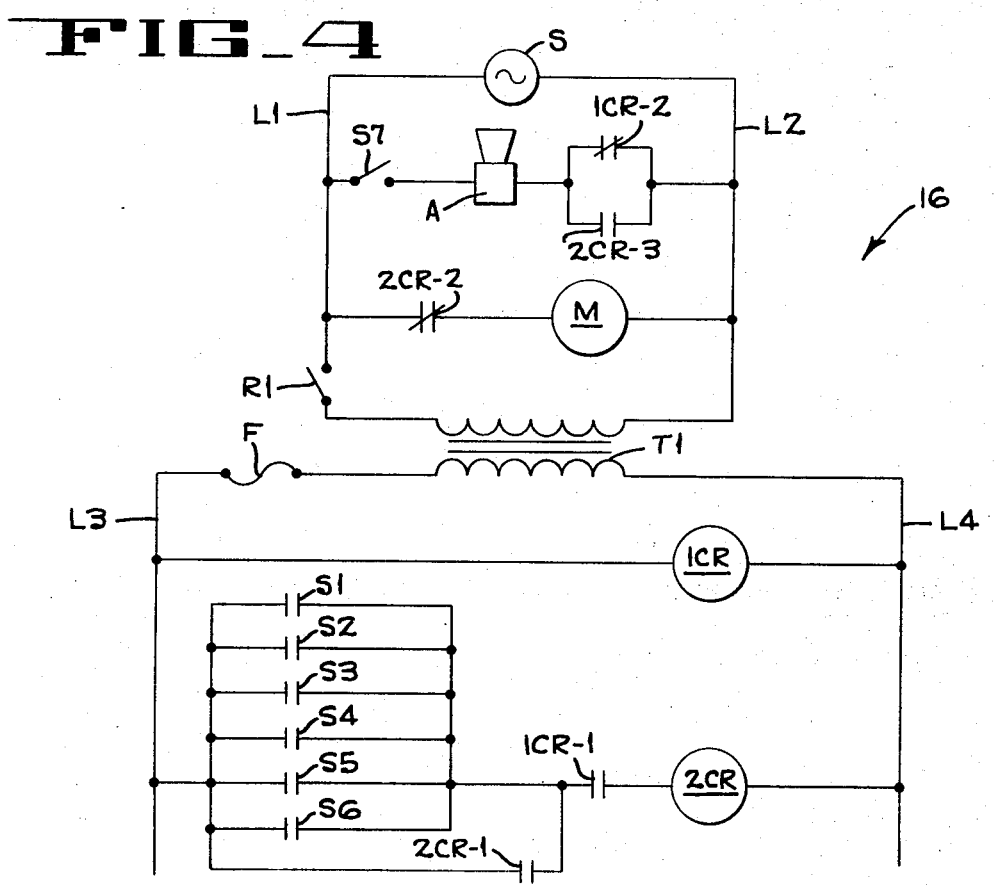

BELT PENETRATION SENSING APPARATUS

BACKGROUND OF THE INVENTION

The present invention relates to belt conveyors and more particularly to a device to protect the belt from tearing after an object has penetrated the belt.

At points at which material is dumped onto a conveyor belt an object may accidentally penetrate the belt. If the belt is stopped immediately, the belt can be repaired without too much difficulty. However, if the belt should continue running and the tear should increase appreciably, the belt may be destroyed beyond repair. Tears from penetrating objects have resulted in the destruction of belting of up to 1,500 feet in length. Since the belt is usually the most expensive item of the entire conveyor installation, it is important to stop the belt when penetration first occurs.

In a previous attempt to provide a belt penetration protection device, a series of force-sensitive switches were placed parallel to the undersurface of the belt. The switches were placed close to the surface of the belt, but this positioning was soon found to be unsatisfactory as the switches were frequently actuated by impacts rather than penetrations because of the deflection of the belt under load. The false signals created by the impacts were costly because of lost time, and the switches were soon covered with a thick layer of material which fouled the switches. The switches were then moved away from the belt to prevent accidental actuation from normal belt deflection, but then many of the penetrating objects would not actuate the switches.

SUMMARY OF THE INVENTION

The apparatus of the present invention is designed to protect a moving web of material, such as a conveyor belt, against tearing after it has been penetrated by an object as, for example, at a loading point. In a preferred form of the invention, six force-sensitive switches are arranged in two groups of three switches and placed under the belt in the region at which the belt is loaded. The array of six switches is wired in parallel as part of an electrical circuit that stops the belt and sounds an alarm when a penetration is sensed. The contact surfaces of the switches are oriented perpendicular to the belt. The switches are further oriented in an end-to-end relationship such that each group of three switches is coextensive with the transverse dimension of the belt.

An object that has penetrated the belt at the loading region will contact one of the six force-sensitive switches, closing the contacts of that switch. As the switch contacts are closed, a control relay is energized to open a first pair of contacts to stop a motor that drives the belt, and to close a second pair of contacts to energize an alarm that signals the belt penetration. The control relay also closes a pair of sealing contacts that are connected across the array of force-sensitive switches to provide a fail-safe feature in the event that the force-sensitive switch is destroyed by the penetrating object.

Accordingly, one of the objects of the present invention is to provide a device to protect a moving web of material from tearing after penetration by an object. A further object of the present invention is to provide a protection device that will only be actuated by belt penetrations and will not give false signals.

BRIEF DESCRIPTION OF THE DRAWINGS

FIG. 1 is a perspective of the conveyor belt at the point of loading showing the placement of the force-sensitive switches.

FIG. 2 is a side elevation of the conveyor showing the drive pulleys, the motor and idler rollers.

FIG. 3 is a perspective of one of the force-sensitive switches with parts broken away.

FIG. 4 is a schematic of the electrical circuit of the present invention.

FIG. 5 is an enlarged side view of a force-sensitive switch being operated by an object penetrating the belt.

DESCRIPTION OF THE PREFERRED EMBODIMENT

The apparatus of the preferred embodiment of the present invention includes a belt conveyor 10, a chute 12 for loading material or objects onto the belt conveyor, force-sensitive elements or switches 14 for registering belt penetrations, and an electrical circuit 16 interconnected with and responsive to the force-sensitive elements for shutting down the conveyor 10 and sounding an alarm A in the event of a belt penetration.

With reference to FIGS. 1 and 2 the belt conveyor 10 of the present embodiment includes an endless troughed belt 20 trained about a drive roll 22, and an idler roll 24 that is spaced some distance from the drive roll 22. The rolls 22, 24 are supported for rotation in a frame 26 and the drive roll 22 is driven by a motor M, also mounted on frame 26, through a chain drive 30.

Intermediate the rolls, the belt 20 and the load thereon is supported for travel by a series of spaced, troughed belt idlers 32. The troughed belt idlers 32 are mounted standards which extend upwardly from a flat horizontal supporting plate 36 on the frame.

The chute 12 through which objects or materials are loaded onto the belt 20 is located near one end of the belt. Material or objects drop through the chute onto a limited region of the belt, a region that has about the same area as the opening of the chute. It is this region of the belt over which objects are dropped that penetrations of the belt can be expected.

In the present embodiment, the force-sensitive switches 14 are positioned below the troughed belt 20 at two locations in the region of expected penetration near the opening of the discharge chute that feeds the conveyor. At each location three switches are oriented in an end-to-end relationship with switch sensing surfaces positioned in a plane perpendicular to the belt such that each group of three switches protects the entire transverse dimension of the belt against penetrations. In the embodiment of the invention shown, the sensing surfaces lie in a substantially vertical plane perpendicular to the horizontal belt. The switches 14 are wired in parallel so that an object 0 (FIG. 2) that has penetrated the belt 20 and that has subsequently contacted a sensing surface of any of the force-sensitive switches 14 will trigger an electrical response to stop the conveyor and ring an alarm.

With reference to FIGS. 1, 2 and 3, it can be seen that all the switches of each group lie in a transverse vertical plane. Each group of switches includes a central switch with upper and lower edges parallel to the plane of the central, horizontal portion of the belt 20, and two side switches with upper and lower edges parallel to the planes of the diagonally disposed sides of the troughed belt. Each group of three switches is mounted on a vertical support plate 46 that is rigidly secured to the horizontal support plate 36 by brackets 48. Each vertical support plate 46 is positioned as close as possible to one of the idler rolls 32 in the loading region and upstream therefrom as illustrated in FIG. 3, so that any penetration occuring between idler rolls in the loading region will be sensed.

The construction of the force-sensitive switches 14 is illustrated in FIGS. 3 and 5. The switches consist of two pliable metal plates 50 that are separated by narrow strips 52 of a non-conductive material sandwiched between the margins of the plates. A wire is attached to each of the plates and the switch is encapsulated in a pliable rubber casing 54. As shown in FIG. 5, when the plates are pushed together, as by a penetration, the switch is closed.

With reference to FIG. 4, power is supplied from source S to the belt penetration sensor circuit through main power lines L1 and L2. The power to the sensor circuit is stepped down to a lower voltage by a transformer T1, the primary of which is connected to lines L1 and L2. Lines L3 and L4 of the sensor circuit are connected to the opposite ends of the secondary of the transformer T1. A control relay 1CR having a normally open pair of contacts 1CR-1 is connected across lines L3 and L4. A second relay 2CR is connected in series across lines L3 and L4 with the normally open switch contacts 1CR-1 of relay 1CR and with the parallel array of normally open switch contacts S1 to S6, which designate the different contact plates 50 of the force-sensitive switches 14. Normally open sealing contacts 2CR-1 of relay 2CR are connected across the parallel array of switch contacts S1 to S6.

With further reference to FIG. 4, the motor M that drives the conveyor is connected in series across the main power lines L1 and L2 in series with normally closed switch contacts 2CR-2 of control relay 2CR. Also connected across main power lines L1 and L2 is alarm A which is connected in series with a parallel array of switch contacts 1CR-2 (normally closed) of control relay 1CR and 2CR-3 (normally open) of control relay 2CR and with a manual switch S7. A reset switch that is mounted on the outside of the control box has switch contacts R1 in the main power line L1.

With the main power source off and the reset switch contacts R1 in line L1 open, no current is flowing in the belt penetration sensor circuit. In this condition switch contacts 1CR-1 are open; contacts 1CR-2 are closed; contacts 2CR-1 are open; contacts 2CR-2 are closed; contacts 2CR-3 are open; and contacts S1 through S7 are open. When the reset switch contacts R1 and the switch contacts S7 are closed, the main power source is energized to energize the sensor circuit. This energizes control relay 1CR which opens the normally closed switch contacts 1CR-2 and closes the normally open switch contacts 1CR-1. If power is not supplied to lines L3, L4, or if the power to these lines should fail because of a blown fuse F from an overload, then alarm A will be energized through switch contacts 1CR-2, and will sound. Switch S7 is incorporated in series with alarm A to allow manual deactivation of the alarm A when necessary.

If a foreign object 0 (FIGS. 2 and 5) should penetrate the moving conveyor belt and contact one of the force-sensitive switches S1 through S6, the contacts of that switch will be closed. And since the switch contacts 1CR-1 of relay 1CR have already been closed, control relay 2CR is energized. With the energization of relay 2CR, the normally open sealing contacts 2CR-1 are closed; the normally closed switch contacts 2CR-2 in series with motor M are opened to stop the motor M and the conveyor belt; and the normally open switch contacts 2CR-3 are closed to sound the alarm.

The sealing contacts 2CR-1 provide a fail-safe feature in the event that the penetration detection switch S1 to S6 which is contacted by a penetrating object is destroyed by the impact of the object. The contacts 2CR-1, once closed, remain closed, and the only way the contacts can be returned to the normal open condition is by manually opening and then reclosing the reset contacts R1. Thus, if the power in the sensor circuit should go off after one of the switches S1 to S6 has been actuated and destroyed, the switch contacts 2CR-1 will remain closed, to sound the alarm and to hold open switch contacts 2CR-2 to keep the conveyor motor deenergized.

In the event of a belt penetration with a consequent sounding of the alarm A and stopping of motor M, an operator must go to the loading region where the sensor circuit and reset switch contacts R1 are located. After inspecting and repairing the belt he will turn the reset switch contacts R1 first to the off position (to deenergize relay 1CR, and thus relay 2CR) and then to the on position (to reenergize relay 1CR without reenergizing relay 2CR) so that switch contacts 2CR-1 will be in the original open condition. If the fuse F has blown in the sensor circuit, the operator will install a new fuse before restarting the conveyor.

Thus it can be seen that the present invention presents a novel device for the protection of the belt of a belt conveyor or other moving web of material that will not be actuated by false signals and that includes a fail-safe feature which will keep the belt stopped in the event of a power failure.

Although the best mode contemplated for carrying out the present invention has been herein shown and described, it will be apparent that modification and variation may be made without departing from what is regarded to be the subject matter of the invention.

What is claimed is:

1. A protection device to protect a moving web of material against tearing by an object penetrating the web of material comprising, in combination, means to support the web for movement along a path, a force-sensitive sensing element having a planar sensing surface inclined with respect to said path, said element being actuated by an object that has penetrated the web, and means responsive to the actuation of the sensing element for stopping movement of the web of material.

2. A device to protect the belt of a belt conveyor from tearing after penetration by an object in the material being carried by the belt, comprising, in combination, force-actuated sensing means positioned below the belt and having means defining a planar sensing surface oriented at an angle to the belt and extending across the belt, said planar sensing surface deflecting under contact with the object penetrating the belt at any lateral position on the belt, and means responsive to the deflection of the sensing element for stopping the belt conveyor.

3. A device to protect the carrying run of a belt of a belt conveyor against tearing after penetration by an object in the material being carried on the belt, comprising, in combination, a force-sensitive switch having a planar sensing surface perpendicular to the belt and positioned below the belt, said sensing surface extending across the belt and deflecting under contact with the object penetrating the belt to actuate the switch at any lateral position on the belt, and an electrical circuit including the switch, said electrical circuit arranged to close as the switch is contacted by the object to stop the movement of the belt.

4. In a belt conveyor system, an endless belt, a motor for moving the belt to convey objects, a chute for loading the objects onto the belt, a plurality of force sensitive switches below and co-extensive with the transverse dimension of the lower surface of the belt, said switches having sensing surfaces substantially perpendicular to the belt for operation by an object that has penetrated the belt, an alarm to signal the penetration of the belt by an object and an electrical circuit that is energized with the operation of one of the switches to stop the motor and ring the alarm, said circuit including sealing contacts, said sealing contacts being actuated with the actuation of the switch to insure that the belt remains stopped in the event that the switch is destroyed by the penetrating object.

* * * * *